US012257676B2

(12) United States Patent
Schmid et al.

(10) Patent No.: US 12,257,676 B2
(45) Date of Patent: Mar. 25, 2025

(54) POWER TOOL WITH THREADED SPINDLE DRIVE

(71) Applicant: Hilti Aktiengesellschaft, Schaan (LI)

(72) Inventors: Florian Schmid, Buchs (CH); Albert Binder, Buchs (CH)

(73) Assignee: Hilti Aktiengesellschaft, Schaan (LI)

( * ) Notice: Subject to any disclaimer, the term of this patent is extended or adjusted under 35 U.S.C. 154(b) by 61 days.

(21) Appl. No.: 18/035,413

(22) PCT Filed: Sep. 13, 2021

(86) PCT No.: PCT/EP2021/075036
§ 371 (c)(1),
(2) Date: May 4, 2023

(87) PCT Pub. No.: WO2022/111875
PCT Pub. Date: Jun. 2, 2022

(65) Prior Publication Data
US 2023/0405779 A1 Dec. 21, 2023

(30) Foreign Application Priority Data
Nov. 27, 2020 (EP) .................................... 20210196
Feb. 11, 2021 (EP) .................................... 21156580

(51) Int. Cl.
*B25B 27/00* (2006.01)
*B21D 39/04* (2006.01)
*B25B 27/10* (2006.01)

(52) U.S. Cl.
CPC ............ *B25B 27/10* (2013.01); *B21D 39/046* (2013.01); *B21D 39/048* (2013.01)

(58) Field of Classification Search
CPC ...................................................... B25B 27/10
See application file for complete search history.

(56) References Cited

U.S. PATENT DOCUMENTS 9,808,851 B2 * 11/2017 Thorson .................. F16H 25/20
10,512,964 B2 * 12/2019 Lütolf .................. B25B 27/146
(Continued)

FOREIGN PATENT DOCUMENTS

DE 102018209819 A1 12/2019
DE 102018115788 A1 1/2020
(Continued)

OTHER PUBLICATIONS

International Searching Authority, International Search Report and Written Opinion in International Application No. PCT/EP2021/075036, mailed Dec. 23, 2021.
(Continued)

*Primary Examiner* — Eyamindae C Jallow
(74) *Attorney, Agent, or Firm* — Leydig, Voit & Mayer, Ltd.

(57) ABSTRACT

A power tool is provided comprising a drive, an output shaft, a threaded spindle drive and a linear actuator, wherein torque generated by the drive is transmissible via the output shaft, and the threaded spindle drive connected to the output shaft, to the linear actuator. the threaded spindle drive has an inner threaded spindle part with an external thread and an outer threaded spindle part with an internal thread, wherein the internal thread interacts with the external thread via at least one bearing roller, and the at least one bearing roller has at least one radially encircling channel by which the bearing roller engages in each case into the external thread and into the internal thread.

20 Claims, 7 Drawing Sheets

(56) References Cited

U.S. PATENT DOCUMENTS

| | | | | |
|---|---|---|---|---|
| 10,675,805 | B2 * | 6/2020 | Lütolf | B25B 27/10 |
| 11,213,875 | B2 * | 1/2022 | Ruch | B25B 27/10 |
| 11,236,849 | B2 * | 2/2022 | Besser | F16L 13/141 |
| 2015/0053447 | A1 * | 2/2015 | Da Rocha | B25B 27/10<br>173/4 |
| 2015/0054358 | A1 * | 2/2015 | Da Rocha | H02K 7/06<br>310/12.19 |
| 2021/0237795 | A1 | 8/2021 | Wenk | |
| 2023/0405779 | A1 * | 12/2023 | Schmid | B25B 25/005 |

FOREIGN PATENT DOCUMENTS

| | | | |
|---|---|---|---|
| DE | 102018124646 | A1 | 4/2020 |
| EP | 4005733 | A1 | 6/2022 |
| WO | WO-2020069696 | A1 * | 4/2020 |

OTHER PUBLICATIONS

NN: “Spielfreier Rollgewindetrieb”, F & M. Feinwerktechnik Mikrotechnik Messtechnik, Hanser, München, DE, Bd. 103, No. 5, May 1, 1995 (May 1, 1995), p. 255, XP002126235, ISSN: 0944-1018.

* cited by examiner

POWER TOOL WITH THREADED SPINDLE DRIVE

CROSS-REFERENCE TO RELATED APPLICATIONS

This patent application is the U.S. National Stage of International Patent Application No. PCT/EP2021/075036, filed Sep. 13, 2021, which claims the benefit of European Patent Application No. 21156580.9, filed Feb. 11, 2021, and European Patent Application No. 20210196.0, filed Nov. 27, 2020, which are each incorporated by reference.

The invention relates to a power tool, in particular a pipe press, comprising a drive, an output shaft, a threaded spindle drive and a linear actuator, wherein a torque generated by the drive is transmissible via the output shaft, and the threaded spindle drive connected to the output shaft, to the linear actuator.

Various power tools for deformation and cutting processes are known from the prior art. By means of these special power tools, it is for example possible for reinforcement bars to be severed, for pipes to be mechanically connected or for hose clamps to be pressed on. The mechanical connection tasks also include so-called crimping, flanging and squeezing.

In order to realize the high pressing forces required for the crimping of steel pipes, for example, commercially available deformation machines have a pressing head which is driven by a pressing cylinder. Here, the pressing cylinder is commonly hydraulically driven for the purposes of moving the pressing head. An electric motor drives, in turn, a hydraulic pump, which outputs the linear movement of the pressing cylinder. Alternatively, mechanical pressing/cutting and crimping power tools are also known which, instead of the hydraulics, generate the pressing pressure by means of a threaded spindle drive in combination with an electric motor. Here, the rotational movement of the electric motor is transformed by means of a threaded spindle into a linear movement. These power tools commonly comprise a transmission which is connected between spindle and electric motor and which serves for reducing the required motor torque, in order to thus be able to dimension the motor to be smaller.

The power tools known from the prior art which have a hydraulically driven linear actuator however tend to be complex to develop, to be too large or too long with regard to handling, to be inefficient, and to be too heavy. Furthermore, the power tools known from the prior art which have a hydraulically driven linear actuator require a relatively long time for a single working cycle, wherein one working cycle may for example be one deformation or cutting cycle.

The threaded spindle drives hitherto provided in the case of such power tools furthermore lead to high friction losses. Tests to minimize these friction losses have hitherto furthermore led to very complex and thus expensive structural designs.

It is therefore an object of the present invention to offer a power tool of the type described in the introduction which is particularly inexpensive and which offers high-efficiency whilst nevertheless having a very high load-bearing capacity.

Said object is achieved by means of a power tool, in particular a pipe press, comprising a drive, an output shaft, a threaded spindle drive and a linear actuator, wherein a torque generated by the drive is transmissible via the output shaft, and the threaded spindle drive connected to the output shaft, to the linear actuator, wherein the threaded spindle drive has an inner threaded spindle part with an external thread and an outer threaded spindle part with an internal thread, wherein the internal thread interacts with the external thread via at least one bearing roller, and the at least one bearing roller has at least one radially encircling channel by means of which the bearing roller engages in each case into the external thread and into the internal thread.

According to the invention, the at least one bearing roller has one or more radially encircling channels. Owing to the at least one channel, it is therefore the case that no helical thread is formed on the bearing roller. The bearing roller is thus kept very simple in terms of structural design and can accordingly be produced inexpensively. When the inner threaded spindle part rotates relative to the outer threaded spindle part, the bearing roller can roll on the internal thread and on the external thread. The bearing roller thus forms a roller bearing, which can exhibit particularly low rolling friction in relation to sliding friction, for example. The threaded spindle drive can thus, for the conversion of the rotational movement into a translation, in particular parallel to an axial direction of the threaded spindle drive, exhibit only low friction losses and thus particularly favorable efficiency. The greater the number of radially encircling channels that the bearing roller has, the greater the loads that can be transmitted and/or generated along the axial direction of the threaded spindle drive.

At least one channel, preferably all channels, may have at least one outwardly domed flank.

The power tool may preferably be a mobile power tool, for example a handheld power tool or a mobile construction robot, in particular for structural engineering and/or civil engineering work, for example for installation work. The power tool may be a pressing device, a cutting device, for example cutting shears, and/or a crimping device.

Preferred embodiments of the invention may have multiple bearing rollers, in particular 3, 4, 6, 8, 10, 12 or 13 bearing rollers. The bearing rollers may be arranged so as to be distributed uniformly over the circumference of the inner threaded spindle part.

The internal thread and/or the external thread are preferably of single-start form.

Simple assembly, in particular partial pre-assembly, is possible if the at least one bearing roller is received in a cage. If multiple bearing rollers are provided, a cage can make it significantly easier to provide an arrangement of the bearing rollers distributed uniformly along the circumference of the inner threaded spindle part.

The cage and/or the rollers may have a translational degree of freedom, in particular parallel to the axial direction, relative to the rest of the threaded spindle drive. A translation of the cage and/or of the rollers can thus be possible in particular parallel to the longitudinal axis of the threaded spindle drive. In particular, a configuration may be provided such that the cage together with the rollers, or the rollers alone if no cage is provided, is or are displaced along the axial direction relative to the inner threaded spindle part and/or relative to the outer threaded spindle part when the inner threaded spindle part rotates relative to the outer threaded spindle part.

The outer threaded spindle part may be fixed so as to be non-rotatable and/or non-displaceable relative to a housing of the power tool. The relative rotation can thus lead to a translation of the inner threaded spindle part relative to the housing.

If the inner threaded spindle part is connected to the linear actuator, the linear actuator can be actuatable and/or actuated by the inner threaded spindle part, in particular by way of the relative rotation.

Also, the outer threaded spindle part may be longer than the at least one bearing roller. Alternatively or in addition, the outer threaded spindle part may be longer than the cage. It is thus possible for the bearing rollers and/or, if present, the cage to be displaced at least over a certain distance in the axial direction without departing from the region of the outer threaded spindle part. For this purpose, the outer threaded spindle part may particularly preferably be at least twice as long as the at least one bearing roller and/or, if present, the cage.

In one class of embodiments of the invention, the linear actuator is mounted on the inner threaded spindle part so as to be rotatable along the longitudinal axis of the inner threaded spindle part, such that the linear actuator is decouplable and/or decoupled from rotations of the inner threaded spindle part, in particular relative to the housing. For this purpose, a rolling bearing, a ball bearing and/or a roller bearing or the like may be arranged between the inner threaded spindle part and the linear actuator.

In particularly preferred embodiments of the invention, the threaded spindle drive, preferably the inner threaded spindle part, may be drivable by the drive via a telescopic shaft device, such that the torque is transmissible to the threaded spindle drive, in particular to the inner threaded spindle part, even in the event of a translation of the inner threaded spindle part in the axial direction. The output shaft may be designed as a telescopic shaft device. Alternatively or in addition, the telescopic shaft device may be designed as part of the output shaft. The telescopic shaft device may have a groove element which is equipped with one or more longitudinal grooves and on which a mating part may preferably be guided.

If the drive is designed as a brushless motor, the power tool can have a particularly long service life, which in turn can improve the cost efficiency of the power tool as considered over the service life.

The torque may be transmissible and/or transmitted via a transmission device, in particular via a reduction transmission, particularly preferably via an eccentric transmission device, to the threaded spindle drive. A speed reduction by a factor in the range of 10 to 1000, in particular in the range of 10 to 100, for example 20, may preferably be provided.

The power tool may thus comprise an eccentric transmission device for a torque adaptation between the drive and the threaded spindle drive, wherein the eccentric transmission device comprises a drive eccentric, which is drivable by the drive, an eccentric toothed gear, which is drivable by the drive eccentric, and a compensating clutch, which is drivable by the eccentric toothed gear and which serves for transmitting torque from the eccentric toothed gear to the output shaft.

Loads acting on the bearing rollers can be spatially distributed, and in particular, tilting moments that act on the bearing rollers under load can be reduced or eliminated entirely, if the bearing roller has at least one radially encircling compensating channel with a load-relief flank. The bearing roller may preferably have at least two, in particular an even number of, similar or substantially similar compensating channels. The at least two, in particular the even number of, compensating channels may preferably each be arranged and/or formed with equal spacings to a center of the bearing roller and in particular so as to be distributed uniformly on both longitudinal halves of the bearing roller.

In particular, it is thus possible by means of the compensating channels, and in particular by means of the load-relief flanks, for the surface profile of the bearing rollers to be set back, preferably in end regions of the bearing roller. The load-relief flanks particularly preferably point in the direction of the center of the bearing roller.

The load-relief flank may be designed such that, even under load, the inner threaded spindle part and/or the outer threaded spindle part particularly preferably does not make contact, or makes contact at most with a contact pressure that is lower than a contact pressure acting on the channels, with the bearing roller, in particular the compensating channel, in the region of the load-relief flank.

One class of power tools is characterized in that the threaded spindle drive has an axial bearing for accommodating forces parallel to the longitudinal axis of the inner threaded spindle part. The axial bearing may thus in particular be designed to decouple the rest of the threaded spindle drive and/or the drive from loads parallel to the longitudinal axis.

It has been found that the service life of the power tool can be significantly influenced by the durability of the axial bearing. The latter may in turn be dependent on the size, in particular on a largest diameter, of the axial bearing.

It is thus favorable if the axial bearing has a largest diameter which is larger than the largest diameter of the internal thread. In particular, the largest diameter of the axial bearing may be at least 3 cm, for example at least 5 cm, particularly preferably at least 6 cm.

In the case of pipe presses, for example, it is commonly the case that at least a major part of the threaded spindle drive is accommodated in the region of a grip region of the power tool. In order to allow a grip region to be gripped, the grip region should have a diameter of at most 5 cm, or better at most 4 cm.

It is thus favorable if the axial bearing is formed and/or arranged outside the grip region.

In particular, the axial bearing may be arranged and/or formed between the drive and the outer threaded spindle part. Said region between the drive and the outer threaded spindle part is commonly situated outside the grip region, or it is at least the case that the grip region does not extend over this entire region. The axial bearing arranged in this region can thus have a particularly large largest diameter.

In a further class of embodiments, the outer threaded spindle part is non-rotatable, and is displaceable parallel to the longitudinal axis, relative to the housing of the power tool.

In the case of such an embodiment, it is then possible for the linear actuator to be coupled to the outer threaded spindle part. In particular, the outer threaded spindle part may be configured to displace the linear actuator, in particular parallel to the longitudinal axis.

In order to further increase the service life, the power tool may have an overload safeguard. Such an overload safeguard can also make it possible to operate the drive with a higher average speed. If the power tool is designed as a pipe press, it is thus possible, for example, for the tool to be opened or closed much more quickly.

The overload safeguard may have a slipping clutch.

Alternatively or in addition, the overload safeguard may have a dynamic stop. In particular, the dynamic stop may be designed to lower the effective spring constant of the overall structure from the threaded spindle drive to the tool. If, for example, a tool designed as a pressing tool with jaws is fully closed, it is thus possible, for example, for a hard impact of the jaws against one another, and a correspondingly intense repercussive impulse, to be dampened or avoided.

It is conceivable in particular for the threaded spindle drive, the linear actuator, the force flow diverting device and/or the tool to have the dynamic stop, for example in the form of a spring assembly.

For further details regarding possible embodiments of the eccentric transmission device, reference is explicitly made to the European patent application with the file reference EP20210196, filing date 11.27.2020, the description, claims and drawings of which are hereby intended to be incorporated in their entirety by explicit reference.

Further advantages will also become apparent from the following description of the figures.

Various exemplary embodiments of the present invention are illustrated in the figures.

The figures, the description and the patent claims contain numerous features in combination. A person skilled in the art will expediently also consider the features individually and combine them to produce useful further combinations.

In the figures, identical and similar components and assemblies are denoted by the same reference signs.

DETAILED DESCRIPTION OF THE INVENTION

Figure 1:
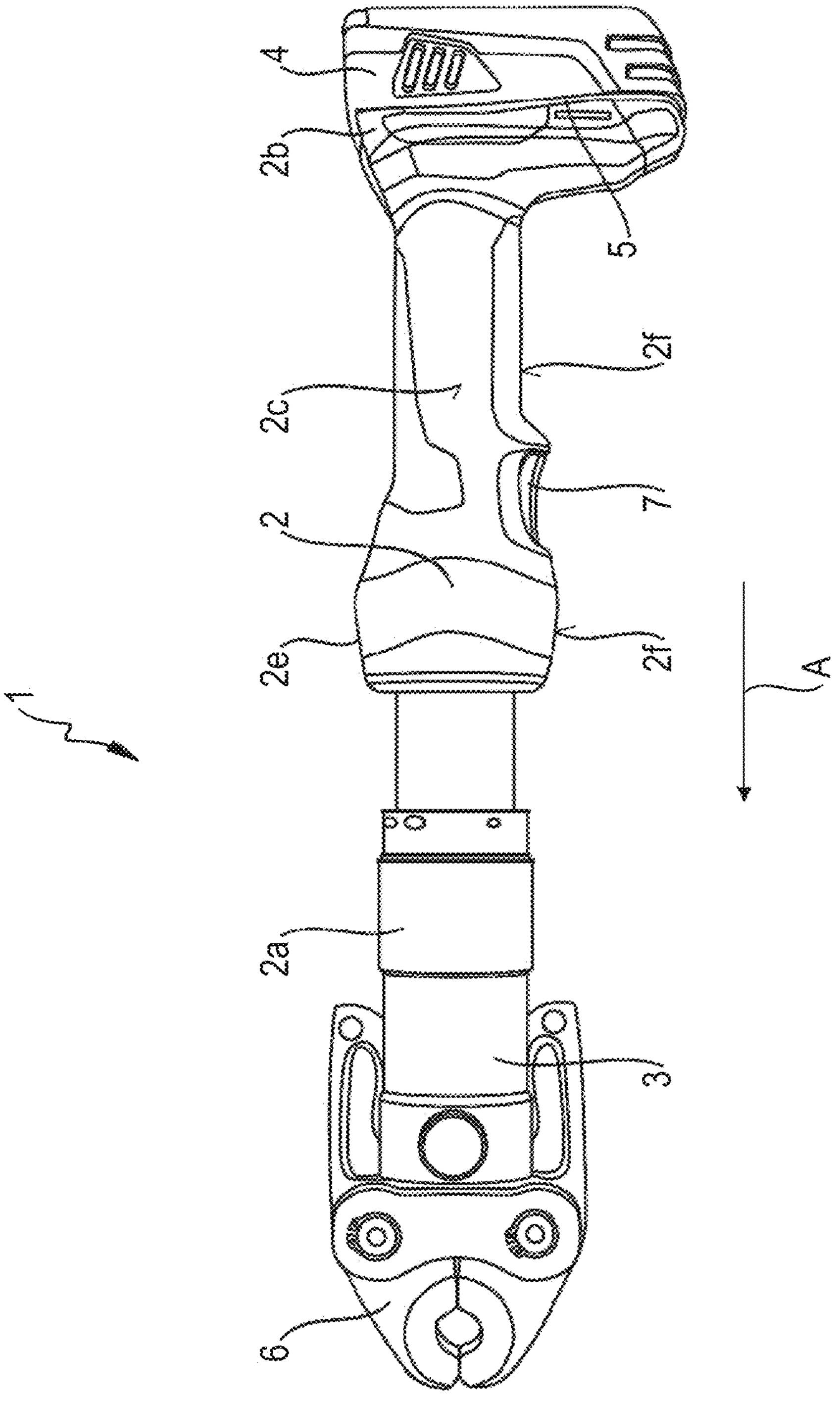
FIG. 1 shows a side view of a power tool in the form of a pipe press.
Figure 2:
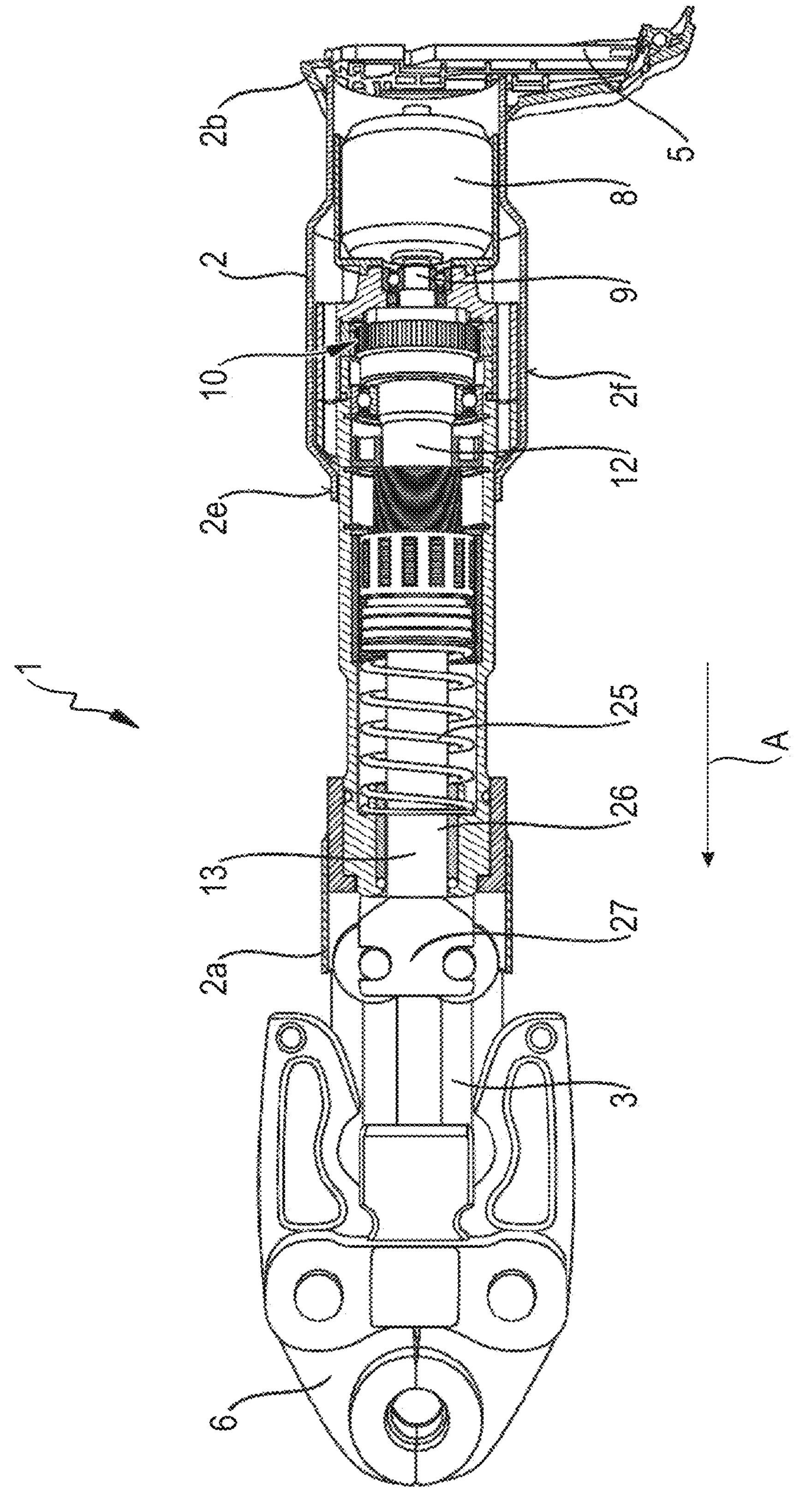
FIG. 2 shows a sectional side view of the power tool in the exemplary form of a pipe press, with a drive, an output shaft, a threaded spindle drive, a linear actuator and an eccentric transmission device.
Figure 3:
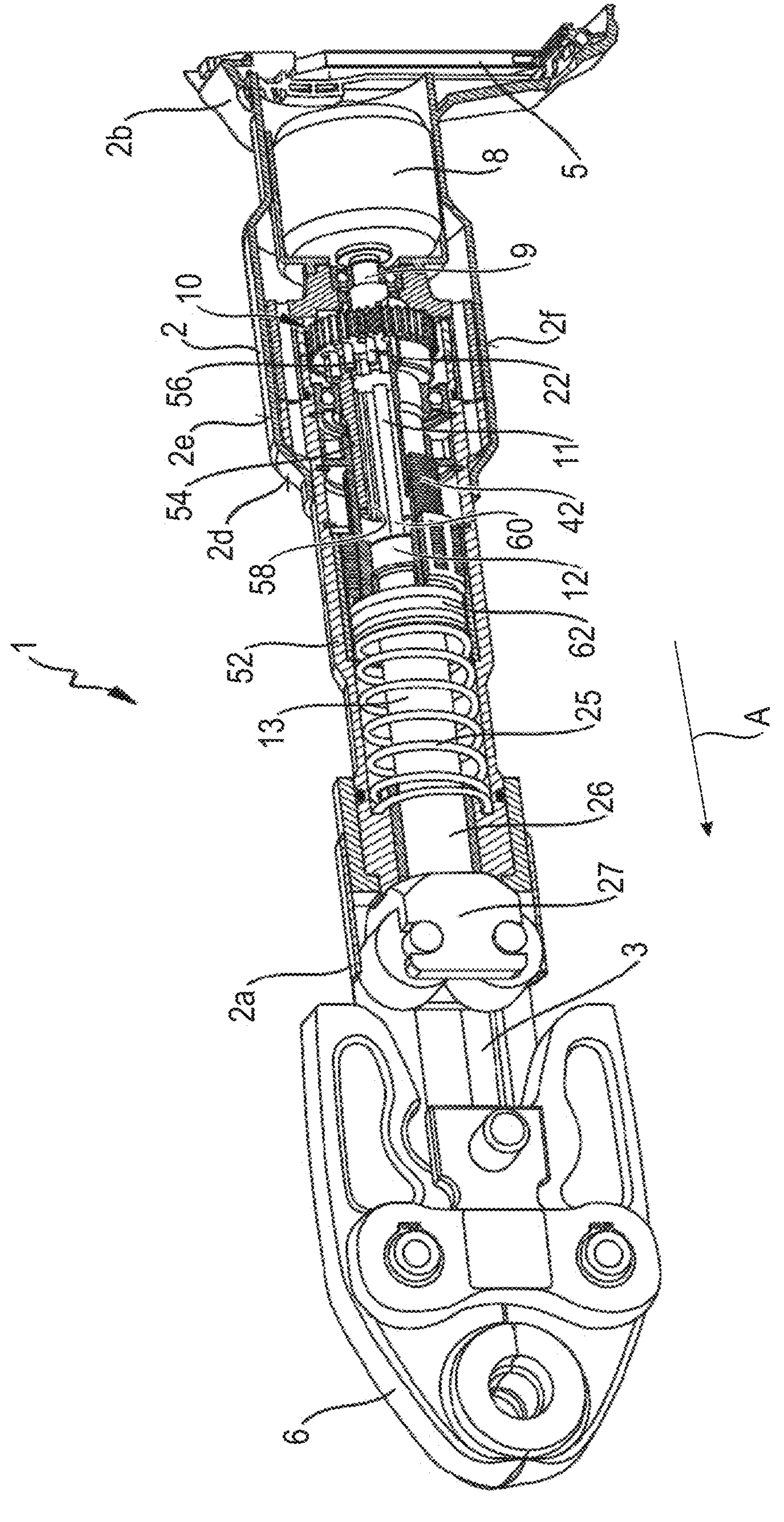
FIG. 3 shows a perspective sectional view of the power tool in the exemplary form of a pipe press, with the drive, the output shaft, the threaded spindle drive, the linear actuator and the eccentric transmission device.

FIGS. 1 to 3 show a power tool 1 according to the invention in an exemplary embodiment as a pipe press. Instead of the embodiment as a pipe press, the power tool 1 may also be embodied as any other cutting or deformation tool. In particular, it is also possible for the power tool 1 according to the invention to be embodied as a dispensing apparatus for chemical substances, such as adhesive or plugging compound. Such dispensing apparatuses can also be referred to as dispensers.

As can be seen in FIG. 1, the power tool 1 embodied as a pipe press substantially has a housing 2, a tool fitting 3 and a power supply 4.

The housing 2 of the power tool 1 is of substantially cylindrical form and comprises a front end 2*a*, a rear end 2*b*, a left-hand side surface 2*c*, a right-hand side surface 2*d*, an upper side 2*e* and a lower side 2*f* A central part 2*g* of the housing 2 serves as a handgrip for allowing the power tool 1 to be held and controlled. Only the left-hand side surface 2*c* is illustrated in FIGS. 1 to 3. The housing 2 transitions into a preferably metallic housing section 52.

The energy supply 4 is positioned at the rear end 2*b* of the housing 2 of the power tool 1. In the present exemplary embodiment, the power supply 4 is in the form of a rechargeable battery (also referred to as power pack or battery), preferably a lithium-based chargeable battery. The power supply 4 in the form of a rechargeable battery may be detachably connected by means of an interface 5 to the rear end 2*b* of the housing 2 of the power tool 1. The power tool 1 or the electrical consumers of the power tool 1 is or are supplied with electrical power by means of the rechargeable battery 4.

In an alternative embodiment of the present invention, the power supply 4 of the power tool 1 may also be embodied as an electrical cable for connecting the power tool 1 to an electrical grid source (that is to say electrical socket).

The tool fitting 3 for detachably receiving and holding a tool 6 is positioned at the front end 2*a* of the housing 2 of the power tool 1. In the present exemplary embodiment, a tool 6 in the form of a deformation tool is positioned at the tool fitting 3. In the present exemplary embodiment, the deformation tool 6 is embodied as a so-called pressing head. The deformation tool 6 embodied as a pressing head serves substantially for the processing and in particular deformation of lines, that is to say pipes and tubes. The lines are not shown in the figures.

An activation switch 7 is positioned on the lower side 2*f* of the housing 2 of the power tool 1. The power tool 1 can be started and stopped by means of the activation switch 7.

Substantially a drive 8, a drive shaft 9, an eccentric transmission device 10, an output shaft 11, a threaded spindle drive 12 and a linear actuator 13 are positioned in the interior of the housing 2 of the power tool 1. In the present exemplary embodiment, the drive 8 is embodied as a brushless electric motor.

As can be seen for example from FIGS. 2 and 3, the drive 8 embodied as a brushless electric motor is connected via the drive shaft 9 to the eccentric transmission device 10. By means of the connection to the drive shaft 9, a torque generated in the drive 8 is transmitted from the drive 8 to the eccentric transmission device 10.

A rotational speed ratio between the drive 8 and the output shaft 11 can be generated by means of the eccentric transmission device 10.

The output shaft 11 adjoins the threaded spindle drive 12. The threaded spindle drive 12 is connected to the output shaft 11. The rotational movement of the output shaft 11 can be converted into a linear movement by means of the threaded spindle drive 12.

The output shaft 11 is designed as a telescopic shaft device. Said output shaft is thus variable in length. For this purpose, said output shaft has a grooved element 54 which is equipped with one or more longitudinal grooves and on which a mating part 56 is guided in axially displaceable fashion. In this regard, one of the longitudinal grooves 58 can be seen by way of example in the sectional illustration in FIG. 3. The grooved element 54 is driven in rotation by the eccentric transmission device 10, whereby, in turn, the mating part 56 guided in the grooved element 54 is carried along and thus driven. The mating part 56 is in turn connected rotationally conjointly, via an axially arranged shaft section 60, in particular by means of a spline connection, to a part of the threaded spindle drive 12.

As can be seen from FIGS. 2 and 3, the threaded spindle drive 12 is connected to the linear actuator 13, in particular by means of an inner threaded spindle part 42, to be discussed in more detail below, and a rolling bearing 62. By means of the rolling bearing 62, the linear actuator 13 is rotationally decoupled from the threaded spindle drive 12 and thus also from the output shaft 11, such that said linear actuator can perform purely translational movements.

The linear actuator 13 comprises substantially a compression spring 25 and a thrust rod 26. Here, the compression spring 25 acts as a restoring spring for the linear actuator 13.

A force flow diverting device 27 is provided at the linear actuator 13. By means of the linear actuator 13 and the force flow diverting device 27, the linear force of the linear actuator 13 is transmitted to the tool fitting 3 such that the tool 6 in the form of a pressing head can be moved between an open and a closed position.

The drive 8, which is embodied as an electric motor, may be configured to rotate with a rotational speed value of between 10 000 and 30 000 rpm at a maximum extension and retraction speed of the linear actuator 13. In particular, a rotational speed value between 15 000 and 25 000 rpm is provided for the drive 8.

Figure 4:
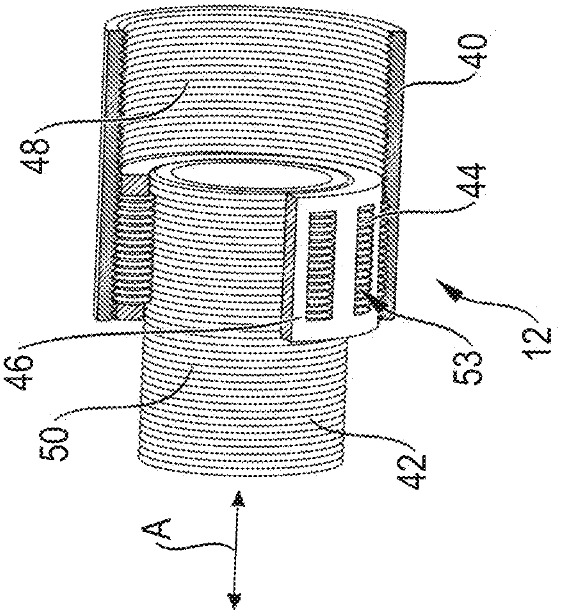
FIG. 4 to FIG. 6 show perspective sectional views of the threaded spindle drive with an inner threaded spindle part, an outer threaded spindle part and a cage with bearing rollers in different states.
Figure 5:
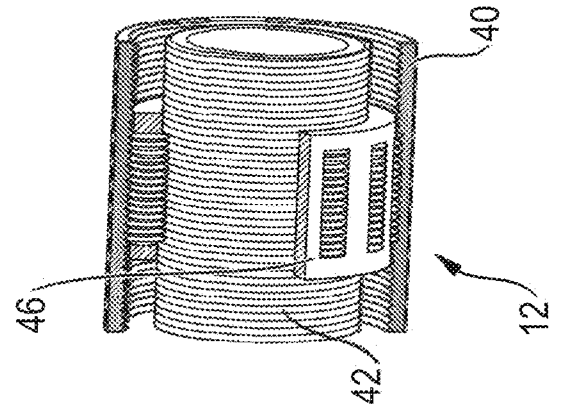
Figure 6:
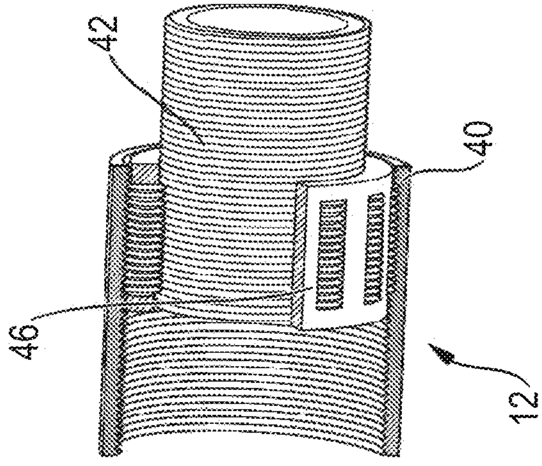

FIGS. 4 to 6 show partially sectional perspective views of the threaded spindle drive 12 in various states.

The threaded spindle drive 12 has an outer threaded spindle part 40 in which the inner threaded spindle part 42 is mounted displaceably by means of bearing rollers 44, one of which is denoted by way of example by a reference sign in FIG. 4. The two threaded spindle parts 40, 42 are of cylindrical or at least substantially cylindrical form. The outer threaded spindle part 40 and the inner threaded spindle part 42 are formed from a metal.

As will be discussed in detail below, the inner threaded spindle part 42 is movable along an axial direction A of the threaded spindle drive 12, in particular along the longitudinal direction thereof.

For this purpose, the outer threaded spindle part 40 has an internal thread 48 and the inner threaded spindle part 42 has an external thread 50. To simplify the illustration, the internal thread 48 and the external thread 50 are denoted by a reference sign only in FIG. 4. The threads 48, 50 are matched to one another. In particular, the leads thereof correspond. The threads 48, 50 may preferably have lead angles in the range of 0.4 to 4°, for example 2°.

The bearing rollers 44 are of rod-shaped, in particular solid cylindrical form. The diameters thereof preferably correspond substantially to half of the difference of the diameters of the two threaded spindle parts 40, 42. The bearing rollers 44 have, on the circumference, a multiplicity of encircling closed channels, of which one channel 53 is denoted by way of example in FIG. 4. The channels 53 run parallel to one another. The spacing thereof to one another is matched to the threads 48, 50.

The bearing rollers 44 are arranged in a cage 46. The cage 46 is formed from a plastic, or may alternatively also be formed from a metal.

The outer threaded spindle part 40 is fixed non-rotatably and non-displaceably to the housing section 52 (see FIG. 3). The outer threaded spindle part 40 is thus positionally fixed relative to the rest of the power tool 1 (see also FIG. 3).

As can be seen viewing FIGS. 4 to 6 together, a rotation of the inner threaded spindle part 42 relative to the outer threaded spindle part 40 leads to a translation of the inner threaded spindle part 42 along the axial direction A relative to the outer threaded spindle part 40, which is positionally fixed relative to the rest of the power tool 1. Here, during the rotation, the cage 46 together with the bearing rollers 44 also travels conjointly within the outer threaded spindle part 40. In particular, the inner threaded spindle part 42 is displaced along the axial direction A at twice the speed in relation to the cage 46 or the bearing rollers 44. Accordingly, the stroke amplitude of the displacement movement of the inner threaded spindle part 42 is also twice as great as that of the cage 46 or of the bearing rollers 44. In order to ensure that the cage 46 and the bearing rollers 44 always move within the outer threaded spindle parts 40, and optimum load transmission thus continues to be ensured, despite a sufficient stroke amplitude of the inner threaded spindle part 42, the outer threaded spindle part 40 is twice as long as the cage 46.

Figure 7:
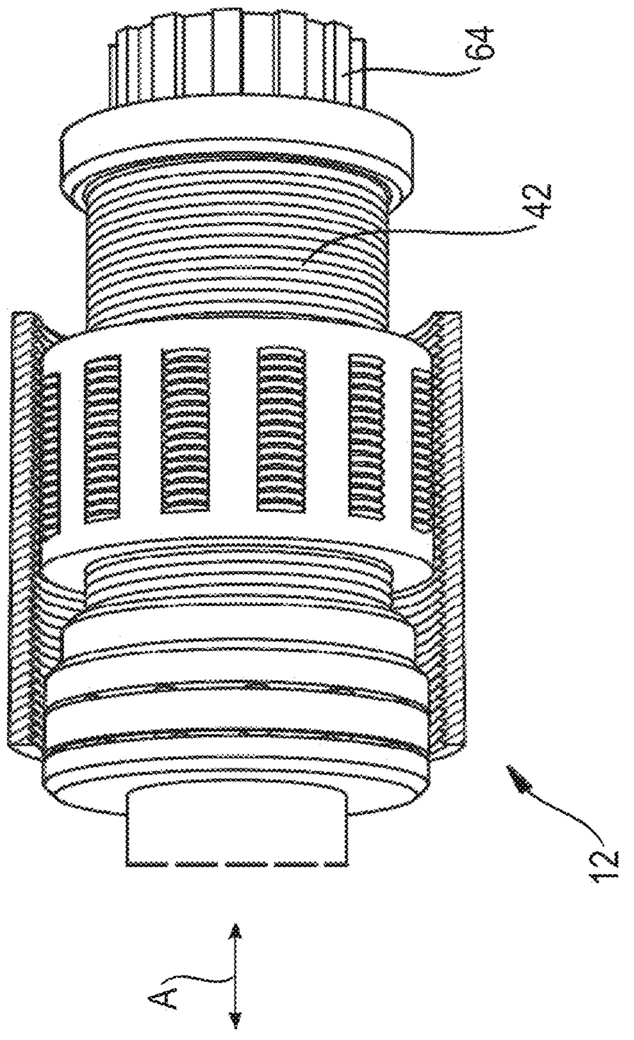
FIG. 7 shows a perspective sectional view of the threaded spindle drive.

FIG. 7 shows the threaded spindle drive 12 in a perspective, partially sectional view. It can be seen here in particular that the inner threaded spindle part 42 has, at one end, in particular at the end facing toward the output shaft 11 (FIG. 3), a spline section 64 for connection to the shaft section 60 (FIG. 3).

It can thus be seen viewing FIGS. 3 and 7 together that the rotating output shaft 11 sets the inner threaded spindle part 42 in rotation, whereby, depending on the direction of rotation, said inner threaded spindle part is displaced forward, that is to say in the direction of the tool 6 (FIG. 3), or rearward, that is to say in the direction of the drive 8 (FIG. 3), along the axial direction A. This in turn causes the linear actuator 13 (FIG. 3) to be actuated, such that the tool 6, which is for example in the form of a deformation tool, opens or closes, or increases or decreases a contact pressure, in a manner dependent on the direction of rotation.

The threaded spindle drive 12, in particular in conjunction with the drive 8, may be configured to exert a maximum shear pressure in the range of 7 N/mm 2 to 14 N/mm$^2$, preferably of 14 N/mm$^2$, on the linear actuator 13. Said threaded spindle drive may alternatively or additionally be configured to drive the linear actuator with a maximum circumferential speed in the range of 5 m/s to 100 m/s, in particular of 60 m/s.

Figure 8:
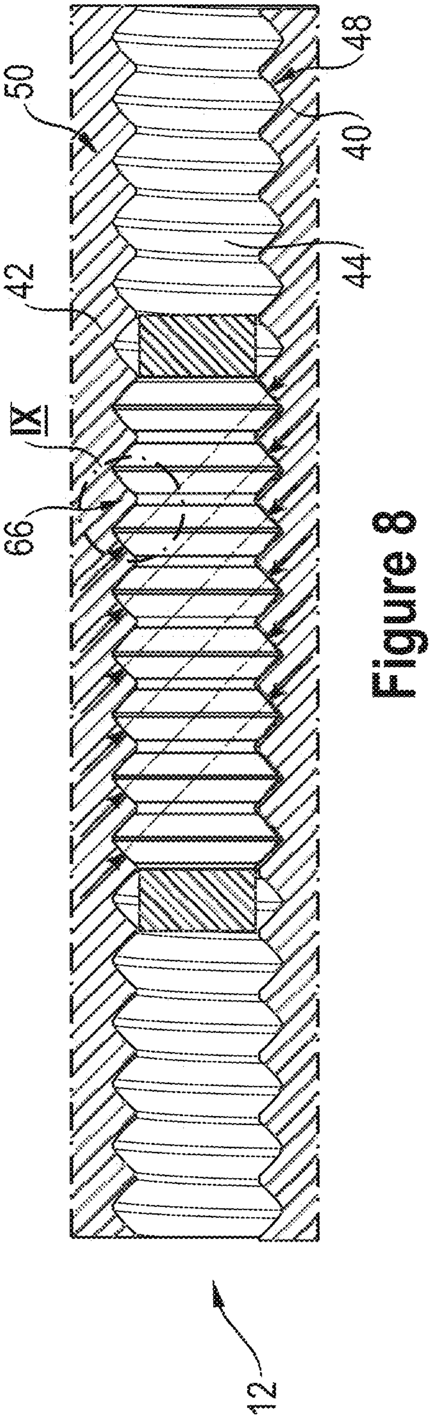
FIG. 8 shows a partially sectional view of a detail of the threaded spindle drive along a bearing roller.
Figure 10:
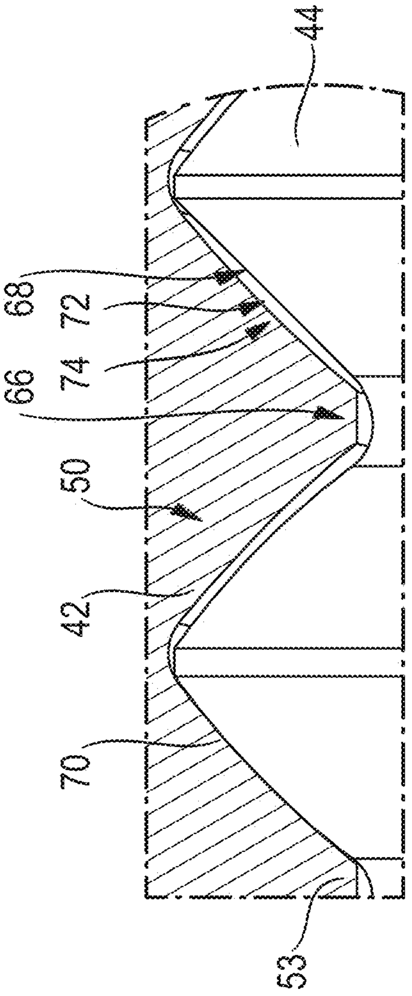
FIG. 10 shows an enlarged detail from the image as per FIG. 9.
Figure 9:
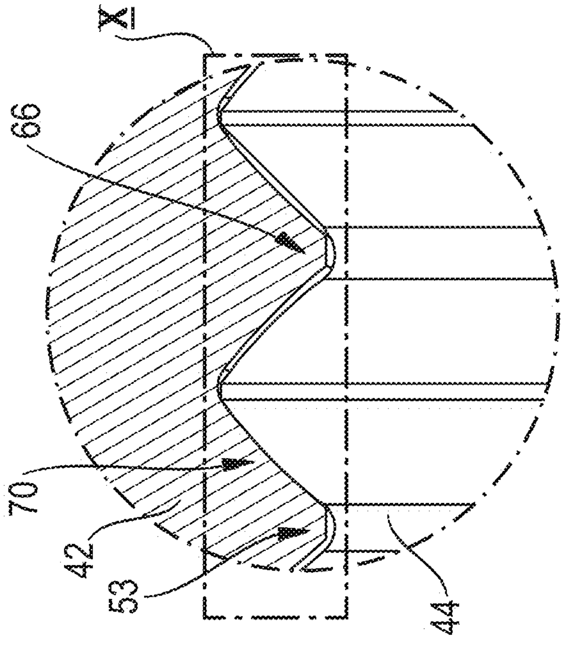
FIG. 9 shows an enlarged detail from the image as per FIG. 8.

FIG. 8 shows the bearing roller 44 in a partially sectional view of a detail of the threaded spindle drive 12. FIG. 9 shows the detail IX as per FIG. 8 in an enlarged illustration. FIG. 10 shows the detail X from FIG. 9 in a further enlarged illustration.

The bearing roller 44 engages by way of channels into each of the external thread and the internal thread 48. In each case one channel 53 is denoted by a reference sign in FIGS. 9 and 10 as an example of the channels.

Arrows are used in FIG. 8 and FIG. 10 to indicate that the channels can accommodate and/or transmit loads via load-accommodating flanks, of which in turn the load-accommodating flank 70 is denoted by a reference sign by way of example for the channel 53, from the inner threaded spindle part 42 with its external thread 50 and/or from the external threaded spindle part 40 with its internal thread 48.

In this exemplary embodiment, the bearing roller 44 has at least one compensating channel 66. The compensating channel 66 is formed in radially encircling fashion around the bearing roller 44. The bearing roller 44 preferably has at least two, in particular an even number of, similar or substantially similar compensating channels. The at least two compensating channels are preferably each arranged and/or formed with equal spacings to the center of the bearing roller 44 and in particular so as to be distributed uniformly on both longitudinal halves of the bearing roller 44.

The compensating channel 66 is designed to compensate a tilting moment that acts on the bearing rollers 44 under load.

It can be seen that the bearing roller 44 also engages by way of the compensating channel 66 into each of the inner threaded spindle part 42 and the outer threaded spindle part 40. For this purpose, unless stated otherwise hereinbelow, the compensating channel 66 may correspond to the channels of the bearing roller 44, in particular the channel 53.

However, by contrast to the channel 53, in particular by contrast to the load-accommodating flank 70, said compensating channel has a load-relief flank 68. In this exemplary embodiment, the load-relief flank 68 is formed such that, under load, the inner threaded spindle part 42 does not make contact, or makes contact at most with a contact pressure that is lower than a contact pressure acting on the other channels, with the bearing roller 44, in particular the compensating channel 66, in the region of the load-relief flank 68. For this purpose, the load-relief flank 68 is preferably of planar form in certain regions, or at least substantially of planar form in certain regions. It is thus the case that, even under load, there is an intermediate space 72 in a region between the load-relief flank 68 and a preferably slightly domed section 74, which is situated opposite said load-relief flank, of the external thread 50.

Figure 11:
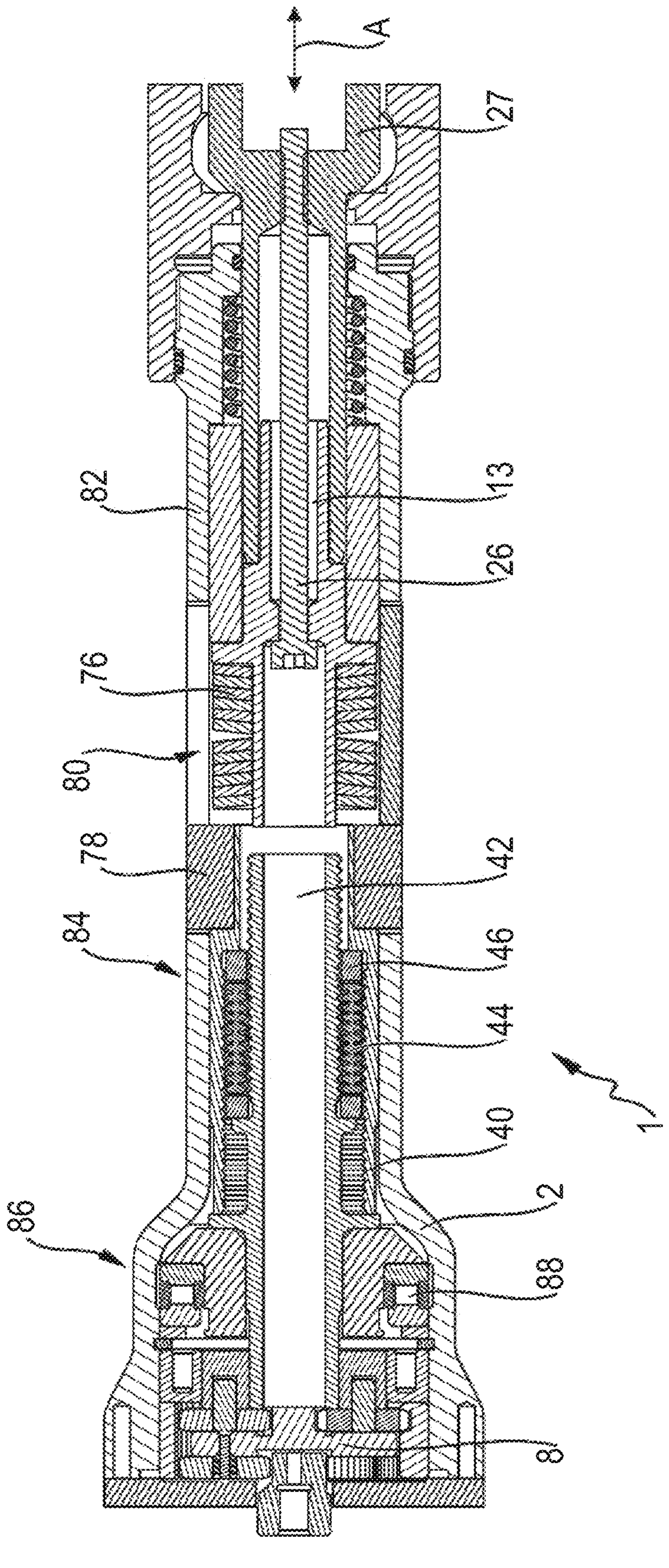
FIG. 11 shows a cross-sectional view of a further power tool.

FIG. 11 shows a cross-sectional view of an interior region of a further embodiment of a power tool 1. Unless stated otherwise hereinbelow, the power tool 1 according to this exemplary embodiment may correspond to the power tools 1 described above. In particular, unless stated otherwise hereinbelow, said power tool may have one or more features of the power tools 1 described above. Unless stated otherwise, the elements of said power tool, for example the outer threaded spindle part 40, the inner threaded spindle part 42 and/or the bearing rollers 44, may correspond to the similar elements described above.

This power tool 1 may in particular also be in the form of a pipe press and in particular in the form of a handheld power tool.

The threaded spindle drive 12 thereof has a dynamic stop 76. This is arranged between the outer threaded spindle part 40 and the linear actuator 13. The dynamic stop 76 is in the form of a spring assembly, in particular a disk spring assembly.

In this embodiment of the power tool 1, the outer threaded spindle part 40 is non-rotatable, and is displaceable parallel to the longitudinal axis, that is to say parallel to the axial direction A, relative to the housing 2 of the power tool 1.

For this purpose, on the outer threaded spindle part 40, there is arranged a guide element 78 which is guided in a guide groove 80 parallel to the axial direction A. The guide groove 80 is formed in a housing part 82 of the housing 2. The outer threaded spindle part 40 is thus fixed so as to be non-rotatable by means of the guide element 78 in conjunction with the guide groove 80.

The linear actuator 13 is coupled to the outer threaded spindle part 40.

In this embodiment, the drive 8 can drive the inner threaded spindle part 42. Said inner threaded spindle part can in turn drive the outer threaded spindle part 40 via the bearing rollers 44. In particular, it is thus possible for the outer threaded spindle part 40 to be displaced parallel to the longitudinal axis. By means of this displacement, the linear actuator 13 coupled to the outer threaded spindle part 40 can then be displaced parallel to the longitudinal axis and thus actuated, such that the force flow diverting device 27 can thereby also be actuated.

The housing part 82 is situated in a grip region 84 of the power tool 1. The grip region 84 forms a part of the housing 2. Said grip region may have an additional housing wall (not illustrated in FIG. 7). The housing wall may be designed to protect the interior of the housing 2, in particular of the grip region 84, against environmental influences, for example against dirt or moisture.

The grip region 84 is of substantially cylindrical form. Its largest diameter is selected such that the power tool 1 can be gripped at the grip region 84 by a hand of a user of the power tool 1. For example, the grip region may have a largest diameter of approximately 4 cm. Here, the diameter of the outer threaded part 40, which is situated at least partially in the grip region 84, is approximately 3.5 cm.

The threaded spindle drive 12 has an axial bearing 88 for accommodating forces parallel to the longitudinal axis of the inner threaded spindle part 42. The axial bearing 88 has a largest diameter of at least 5 cm.

For this purpose, the axial bearing 88 is arranged in a region between the drive 8 and the outer threaded spindle part 40. The housing 2 has a larger largest diameter in this region than in the grip region 84, such that sufficient space is available for the axial bearing 88 within this region.

LIST OF REFERENCE SIGNS

1 Power tool
2 Housing
**2*a* Front end 2*a*** of the housing
**2*b*** Rear end of the housing
**2*c*** Left-hand side surface of the housing
**2*d*** Right-hand side surface of the housing
**2*e*** Upper side of the housing
**2*f*** Lower side of the housing
3 Tool fitting
4 Power supply
5 Interface
6 Tool
7 Activation switch
8 Drive
9 Drive shaft
10 Eccentric transmission device
11 Output shaft
12 Threaded spindle drive
13 Linear actuator
15 Compression spring
26 Thrust rod
27 Force flow diverting device
30 Bearing
40 Outer threaded spindle part
42 Inner threaded spindle part
44 Bearing roller
46 Cage
48 Internal thread
50 External thread
52 Housing section
53 Channel
54 Grooved element
56 Mating part
58 Longitudinal grooves
60 Shaft section
62 Rolling bearing
64 Spline shaft section
66 Compensating channel

68 Load-relief flank
70 Load-accommodating flank
72 Intermediate space
74 Section
76 Dynamic stop
78 Guide element
80 Guide groove
82 Housing part
84 Grip region
86 Drive section
88 Axial bearing
A Axial direction
DA Diameter of a cutout
DK Diameter of a clutch element
DH Inner diameter of the internally toothed gear
E Eccentricity of the eccentric toothed gear
IX Detail
X Detail

The invention claimed is:

1. A power tool comprising a drive, an output shaft, a threaded spindle drive and a linear actuator, wherein a torque generated by the drive is transmissible via the output shaft, and the threaded spindle drive connected to the output shaft, to the linear actuator, wherein the threaded spindle drive has an inner threaded spindle part with an external thread and an outer threaded spindle part with an internal thread, wherein the internal thread interacts with the external thread via at least one bearing roller, and the at least one bearing roller has at least one radially encircling channel by which the bearing roller engages in each case into the external thread and into the internal thread.

2. The power tool as claimed in claim 1, wherein the at least one bearing roller is received in a cage.

3. The power tool as claimed in claim 1, wherein the cage and/or the at least one bearing roller have a translational degree of freedom relative to the rest of the threaded spindle drive.

4. The power tool as claimed in claim 1, wherein the outer threaded spindle part is fixed so as to be non-rotatable and/or non-displaceable relative to a housing of the power tool.

5. The power tool as claimed in claim 1, wherein a length of the outer threaded spindle part is longer than a length of the at least one bearing roller.

6. The power tool as claimed in claim 1, wherein a length of the outer threaded spindle part is at least twice as long as a length of a shortest bearing roller.

7. The power tool as claimed in claim 1, wherein the linear actuator is mounted on the inner threaded spindle part so as to be rotatable along a longitudinal axis of the inner threaded spindle part.

8. The power tool as claimed in claim 1, wherein the threaded spindle drive is drivable by the drive via a telescopic shaft device.

9. The power tool as claimed in claim 8, wherein the inner threaded spindle part is drivable by the drive via a telescopic shaft device.

10. The power tool as claimed in claim 1, wherein the drive is a brushless motor.

11. The power tool as claimed in claim 1, wherein the torque is transmissible and/or transmitted via a transmission device to the threaded spindle drive.

12. The power tool as claimed in claim 11, wherein the torque is transmissible and/or transmitted via a reduction transmission to the threaded spindle drive.

13. The power tool as claimed in claim 12, wherein the torque is transmissible and/or transmitted via an eccentric transmission device to the threaded spindle drive.

14. The power tool as claimed in claim 1, wherein the at least one bearing roller has at least one radially encircling compensating channel with a load-relief flank, wherein the load-relief flank is designed such that, even under load, the inner threaded spindle part and/or the outer threaded spindle part does not make contact, or makes contact at most with a contact pressure that is lower than a contact pressure acting on the at least one radially encircling channel with the bearing roller in a region of the load-relief flank.

15. The power tool has claimed in claim 1, wherein the threaded spindle drive has an axial bearing for accommodating forces parallel to a longitudinal axis of the inner threaded spindle part.

16. The power tool as claimed in the preceding claim; claim 15, wherein the axial bearing has a largest diameter which is larger than a largest diameter of the outer threaded spindle part.

17. The power tool as claimed in claim 15, wherein the axial bearing is arranged and/or formed outside a grip region.

18. The power tool as claimed in claim 15, wherein the axial bearing is arranged and/or formed between the drive and the outer threaded spindle part.

19. The power tool as claimed in claim 1, wherein the outer threaded spindle part is non-rotatable, and is displaceable parallel to the longitudinal axis, relative to a housing of the power tool.

20. The power tool as claimed in claim 1, wherein the threaded spindle drive, the linear actuator, a force flow diverting device and/or a tool have a dynamic stop.

* * * * *